3,122,592
PREPARATION OF ALKYLLITHIUM COMPOUNDS
Kenneth C. Eberly, Akron, Ohio, assignor to The Firestone Tire & Rubber Company, Akron, Ohio, a corporation of Ohio
No Drawing. Filed July 5, 1960, Ser. No. 40,545
3 Claims. (Cl. 260—665)

This invention relates to the preparation of alkyllithium compounds. The alkyllithiums have come into some importance as catalysts for the polymerization of diolefins.

Heretofore these compounds have been prepared by reacting alkyl halides with lithium metal in a suitable solvent medium. However, this method leaves much to be desired, in that the reaction is rather slow, and undesirable side reactions of the Wurtz-Fitting type tend to lower the yield.

According to this invention the lithium used contains a small amount of sodium or another alkali metal or alkaline earth metal alloyed with the lithium. The preparation of the alloy is preferably carried out in a hydrocarbon vehicle.

The reaction of the alkyl halide with the lithium alloy occurs essentially at the surface of the metal, so the more finely divided the metal is, the more surface will be available for the reaction and the more rapidly it takes place. In general it will be desirable to have the metal in the form of granules ranging in diameter from 0.001 to 1 mm., and the reaction mixture will be vigorously agitated during the reaction.

The sodium or other alloying metal is present in the lithium in an amount equal to about 0.3–1.0 percent, based on the weight of lithium. Instead of sodium, other alkali metals and alkaline earth metals such as potassium, calcium, barium or strontium may be employed. It is found that the presence of these alloyed metals substantially accelerates the rate of reaction with the alkyl halide. The preferred catalyst is an alloy of 99.4 to 99.65 percent of lithium and 0.6 to 0.35 percent of sodium. In order to exert the desired accelerating action, these metals must be alloyed with the lithium—i.e., dissolved therein so as to form a single phase therewith. It is not sufficient that these extraneous alkali metals or alkaline earth metals be present as a separate phase of granules distinct from the lithium granules.

Alkyl halides suitable for use in this invention comprise any monohalo alkane containing from 2 to 8 carbons, inclusive. The halogen may be chlorine, bromine or iodine and is attached to any carbon in the chain. Suitable alkyl halides will be seen to include 1-chloropropane, 2-chloropropane, 2-bromo-2-methylpropane, 1-chlorobutane, 2-chlorobutane, 1-chloropentane, 1-chlorohexane, 1-chlorooctane, 1-bromobutane, 2-bromobutane, 1-iodohexane, 1-chloro-3-methyl hexane, 1-chloroheptane, 1-dichlorooctane, and the like. Chlorides are preferable in usage to bromides, and bromides are preferable to iodides, as the Wurtz-Fittig reaction becomes more prominent with the bromides, and still more so with the iodides.

Although no explosive reactions have ever been observed in the practice of this invention, it is thought that such reactions might occur in the absence of an inert liquid vehicle. The presence of substantial quantities of such vehicles avoids this possible danger. Also, in the latter stages of the reaction, the alkyl halide is largely consumed and, if no other liquid is present, the reaction mass becomes rather difficult to handle. Likewise, the vehicle provides a certain measure of protection for the reactants and products against any accidental or unavoidable exposure to the atmosphere. Suitable vehicles are in general the lower, relatively fluid hydrocarbon solvents (containing 4 to 14 carbon atoms) free from ethylenic unsaturation, such as pentane, hexane, petroleum ether, kerosene, benzene, toluene, xylene and the like. Higher hydrocarbon liquids containing up to 30 or 40 carbon atoms, such as mineral oil, lubricating oil and the like may also be used. The lithium is advantageously added to the vehicle suspended in a liquid petrolatum which is then dissolved into the solvent. The reaction medium should, of course, be free from ether and other polar solvents. In general, it is desirable that the vehicle be present to the extent of at least 75 percent (there would be no theoretical maximum) and preferably 75 percent to 85 percent, based on the total volume of alkyl halide and vehicle. As the volume percent of the vehicle decreases below 75 percent, the danger of uncontrollable reaction progressively increases. Conveniently, the vehicle constitutes 55 to 90 percent by volume of the final composition.

The following illustrates the preparation of a paste by suspending finely ground sodium-lithium alloy in liquid petrolatum:

To a 19.7-cm. O.D. by 15.5-cm. high, ellipsoid-of-revolution, stainless steel blender were charged about 450 grams of lithium-sodium alloy (about 0.35% Na) and enough Chesebrough-Pond white petroleum jelly ($d_{22}^{22}$, 0.855) to make a 35-percent paste. The blender was fitted to a high-speed stirrer (and cap), and an argon inlet, batch thermometer and 5-liter heating mantle. The whole was heated in a brisk stream of argon to 186–191° C. in the course of 45 minutes or so. At this point the lithium was all molten, and the whole was stirred at 15,000 r.p.m. for 15–30 minutes, not allowing the tempertaure to exceed 215° C. (preferably not over 200° C. by lowering the voltage on the heating mantle or removing the mantle entirely at the proper time). The high-speed stirring was interrupted as the temperature fell to 186–7° C. (just above the congealing point of lithium), and a speed of a few hundred r.p.m. was maintained for the next 50-odd minutes required for the molten mass to cool to 130° C. As the whole reached 130° C. it was quickly poured into a suitable container (filled with argon) and shaken until it congealed in order to insure homogeneity. The paste was preserved tightly stoppered under argon.

High concentration dispersions of lithium alloy of very small particle size can be made in Vaseline or oils of equal or higher viscosity. Very poor dispersions result when oils of lesser viscosity are employed unless oleic acid is used as a dispersing aid. However, oleic acid coats the lithium and greatly inhibits its reactivity with a monohaloalkane.

In general, the reaction is carried out at temperatures in the range of 0° to 60° C. inclusive. Temperatures in the intermediate portion of the range, say 25°–40° C. are preferred, as this results in a more rapid rate of reaction under any given conditions of reactant composition, etc., and also decreases the proportions of side reactions such as Wurtz-Fittig reactions. At temperatures of 40° C. and above, the newly formed alkyllithium becomes increasingly unstable. The length of time over which the reaction is prosecuted is, of course, without any theoretical limits; some alkyllithium will be produced in the first instant of the reaction, and no harm will ensue if the reaction conditions are prolonged indefinitely. The progress of the reaction can be followed analytically, as explained below.

The chief undesirable side reaction in the treatment of alkyl halides with lithium is the Wurtz-Fittig formation of higher alkane chains. Alkyl halide is preferably added incrementally at such a rate that no undue temperature rise be experienced. It will be understood that the reaction should be carried out in the absence of air, moisture, or other materials which are reactive with lithium.

Closed reaction vessels should be used, and the free spaces thereof should contain only the vapors of the alkyl halide, vehicle and inert gases such as helium, argon and the like.

ANALYTICAL CONTROL OF THE REACTION

Two general types of reaction occur during the applicant's process, represented by the following equations, in which "alkyl" represents the alkyl radical, and "hal" represents a halogen atom:

The desired replacement of halogen with lithium:

(1)    alkyl-hal+2Li→alkyl-Li+LiCl

Wurtz-Fittig reactions, represented overall without intermediate steps:

(2)    2alkyl-hal+2Li→(alkyl)$_2$+2LiCl

If a sample of the reaction is decomposed with water at any stage, the following reactions take place:

(3)    alkyl-Li+H$_2$O→LiOH+alkyl-H (4)    Li+H$_2$O→LiOH+½H$_2$

The lithium hydroxide from Reactions 3 and 4 may be titrated with hydrochloric acid against phenolphthalein or methyl orange.

In order to determine the amount of alkyl lithium formed per Reaction 1, use may be made of the very much more rapid reaction (see Gilman and Haubein, J. Am. Chem. Soc. 66, 1515–6 (1944)) (compared to lithium metal) of alkyl lithiums with benzyl chloride in absolutely dry ether according to the reaction.

(5)
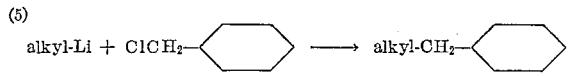

Thus, the contribution of LiOH from Reaction 3 is destroyed, and the decrease in acid titer from before, to after, the treatment of the mass with benzyl chloride is a direct measure of the amount of alkyl-Li present. On this basis:

(6)
$$\frac{\text{Gram moles of alkyl-Li}}{\text{Gram moles of alkyl-Li} + \text{gram atoms of Li}} = \frac{\text{Acid titer before treatment with benzyl chloride} - \text{Acid titer after treatment with benzyl chloride}}{\text{Acid titer before treatment with benzyl chloride}}$$

The detailed procedure for making this determination is described below in Example I.

With the foregoing general discussion in mind, there are given herewith detailed examples of the practice of this invention. All parts given are by weight.

EXAMPLE I

*Butyllithium in Toluene*

A one-liter, 4-necked flask was fitted with a one-gallon water bath, condenser and calcium chloride tube, high-speed stirrer, argon inlet and 250-ml. dropping funnel. The flask was charged with 50.05 grams of 34.67 percent lithium-Vaseline paste (0.59% Na on lithium; 17.35 grams or 2,500 gram-atoms of lithium) and 500 ml. of boiled, cooled toluene (reagent grade). The air was swept from the flask with argon, then the flow of argon was set at 2 bubbles per second for the run. With cooling water in the bath (13° C.) 115.71 grams (1.250 gram-moles or 130.5 ml.) of 1-chlorobutane ($n_D^{20}$, 1.40919) was started into the rapidly stirred slurry of lithium in toluene at the rate of 2.17 ml. per minute. The temperature of the batch rose as high as 43° C. when the bath was 13° C. When about three-fourths of the 1-chlorobutane was added, the bath temperature was gradually warmed. All of the 1-chlorobutane was added in exactly one hour. The whole was stirred for another half-hour with a warm water bath on the reactor. The batch temperature varied from 33 to 43° C. for the run (1½ hours) while the bath temperature varied from 13 to 36° C. At this point the purple slurry was pressured with argon into an argon-filled, 28-oz. bottle (capped under argon). The volume of the slurry was 650 ml.

The charge consisted of 69.4 ml. of lithium paste, 130.5 ml. of 1-chlorobutane and 500 ml. of toluene. Recovered were 650 ml. of slurry and 2 ml. of liquid holdup left in the vessel. The loss and contraction of volume amounted to 48 ml.

The emptied flask and stirrer were rinsed with water to yield 302 ml. of aqueous rinse. A 33.8-ml. aliquot titrated 6.52 ml. of 0.20761 N hydrochloric acid to methyl orange.

$\frac{302}{33.8} \times 6.52 \times 0.20761 \times 0.00694 = 0.0839$ gram of titratable Li in the holdup One ml. of slurry titrated 9.70 ml. of 0.20761 N hydrochloric acid to methyl orange. One ml. of slurry was treated for 2 minutes in argon with 1.6 ml. of dry benzyl chloride and 10 ml. of sodium-dried ether: after dilution the titration was 2.26 ml. of 0.20761 N hydrochloric acid to methyl orange.

$\frac{9.70 - 2.26}{9.70} = 76.70\%$ of titratable Li was C-bound Li.

$9.70 \times 0.20761 \times 0.00694 = 0.014008$ g. titr. Li/ml. slurry.
$0.014008 \times 0.7670 = 0.010720$ g. C-bound Li/ml slurry.
$0.014008 \times 650 = 9.0845$ g. titr. Li in slurry.
    $0.0839$ g. titr. Li in holdup.
    $\overline{9.1684}$ g. titr. Li in formed.

Ratio, $\frac{\text{titratable Li}}{\text{charged Li}} = \frac{9.1684}{17.35} = 0.5284$.

Extent of all reactions $= \frac{1.0000 - 0.5284}{0.5000} = 94.32\%$ $\frac{9.1684 \times 0.7670}{0.5 \times 17.35} = \frac{7.0322 \text{ g. C-bound Li}}{8.675}$ $= 81.06\%$ of theory yield of C-bound Li as butyllithium.

EXAMPLE II

*Amyllithium in Heptane*

A one-liter, 4-necked flask was fitted with high speed stainless steel stirrer (1¼ inches), dropping funnel, argon inlet, 7° C. condenser topped with a calcium chloride tube, and cold and warm water bath. The flask was charged with 52.00 grams of 34.70 percent lithium paste in liquid petrolatum (0.39% sodium on the lithium; 18.044 grams or 2.600 gram-atoms of lithium) and 458 ml. of dry, purified heptane. The air was flushed out with argon, then a slow flow of argon was maintained for the run. Exactly 138.58 grams (1.300 gram-moles; 156.7 ml.) of slightly impure 1-chloropentane (B.P., 104.6–107.1° C. (corr.) at 731.5 mm.; F.P., −99 to −100° C.; $n_D^{20}$, 1.41235) were charged to the dropping funnel. The input of 1-chloropentane to the rapidly stirred lithium was about 1.5 ml. per minute. The flask had to be cooled during the addition of 1-chloropentane, then warmed afterwards. The batch temperature for the run was 27.2–35.2° C. while that of the batch was 15.0–32.0° C. Exactly 105 minutes were required to add the 1-chloropentane and 4–21/60 hours were required for the complete reaction. The purple slurry was forced with argon pressure and 50 ml. of purified heptane (as rinse) into a 28-oz., argon-filled bottle (and capped under argon) (volume, 686 ml.). The extent of all reactions was 100 percent. 80.09 percent of theory yield of carbon-bound Li was obtained as amyllithium.

EXAMPLE III

*Butyllithium in Heptane*

A 2-liter, 4-necked flask was fitted with reflux condenser (and calcium chloride tube), batch thermometer, dropping funnel, argon inlet and cooling (and warming) bath. Exactly 131.69 grams of lithium-Vaseline paste (1.115% alloyed Na; 44.971 grams or 6.480 grams-atoms of lithium) and 650 ml. of dry, purified heptane were charged to the flask. With slight cooling 249.94 grams (2.700 gram-moles) of dry 1-chlorobutane (B.P., 77.6–78.0° C. at 739 mm.) diluted with 350 ml. of dry, purified heptane were added in the course of 152 minutes (the reaction temperature varied from 22.5 to 36° C.). The whole was then stirred for an additional two hours, keeping the reaction temperature at 29–30° C. with a slightly warmed water bath. After this, the whole was quantitatively rinsed with 260 ml. of dry, purified heptane and argon pressure into two 28-oz., argon-filled bottles and capped (total volume of slurry, 1567 ml.). After standing for 15 hours 1343 ml. of nearly clear liquid were pressured with argon into an argon-filled, one-gallon bottle (and capped). The total residue (224 ml.) was collected in a 28-oz. bottle using 586 ml. of dry, purified heptane as rinse (final volume, 810 ml.), allowed to settle several times, and the residue was separated each time and washed with dry, purified heptane. A total of 3043 ml. of clear butyllithium solution were obtained and pressured into an argon-filled bottle.

In summing up, a 20-percent excess of lithium reacted with 1-chlorobutane in heptane at 22.5–36° C. to give a 92.70-percent-of-theory yield of butyllithium (activity, 91.1% of the soluble titratable lithium). The molarity of the butyllithium solution was 0.8123. Seven and three-tenths percent of the 1-chlorobutane reacted to form Wurtz-Fittig product.

EXAMPLE IV

*Ethyllithium in Heptane*

A one-liter, 4-necked flask was fitted with high-speed stirrer, reflux condenser and calcium chloride tube, batch thermometer, argon inlet, ethyl chloride inlet (dipping to the bottom of the flask so it would be beneath the surface of the reaction medium) and cooling (or warming) bath.

When all was ready 32.06 grams of 34.62 percent lithium-Vaseline paste (0.55% alloyed sodium in the lithium; (11.10 grams or 1.600 gram-atoms of lithium) and 400 ml. of dry, purified heptane were charged to the flask. The air was expelled with argon, then under a slow flow of argon, gaseous ethyl chloride from a small, weighed reservoir was slowly run in beneath the surface of the stirred mixture. The temperature started to rise rapidly, therefore the input of ethyl chloride and application of cooling water were so regulated that the batch temperature remained between 20 and 35° C. In the course of 93 minutes 48.4 grams (0.750 gram-mole) of ethyl chloride were introduced. After all of the ethyl chloride was introduced, the whole was kept at 30–5° C. for one hour while rapidly stirred. After this, the whole was quantitatively rinsed with 315 ml. of dry, purified heptane and argon pressure into a 28-oz. bottle (capped under argon) (total volume, 756 ml.). After standing for some time lithium chloride and lithium settled to the floor of the bottle while crystals of ethyllithium separated out on the walls of the bottle. Exactly 470 ml. of clear liquid were transferred to a 64-oz. bottle under argon, then 400 ml. of heptane were added to the remaining 86 ml. of slurry, and the whole was shaken. After settling, 390 ml. of clear liquid were added to the 64-oz. bottle, then 350 ml. of new heptane were added to the slurry, and mixed in. After the whole had settled for some time 270 ml. of clear liquid were transferred to the 64-oz. bottle (making 1435 ml. in that bottle by direct measurement).

Results: 82.7 percent of the heptane-soluble lithium was present as ethyllithium. 39.20 percent of the ethyl chloride went to $C_2H_5Li$.

EXAMPLE V

*n-Butyllithium Solution in Heptane*

A 2-liter, 4-necked flask was fitted with reflux condenser (and calcium chloride tube), high-speed stirrer, dropping funnel, argon inlet, batch thermometer and ice bath. After drying the whole and flushing with argon, 40.11 grams of 34.61 percent lithium-Vaseline paste (0.6% Na in the lithium, 2.000 gram-atoms of lithium) were charged to the flask along with 900 ml. of dry, purified heptane. The whole was then slurried. In the course of 2 hours a mixture of 92.57 grams (1.000 gram-mole) of n-butyl chloride (B.P., 77.6–78.0° C. at 735 mm.) and 100 ml. of dry, purified heptane were added dropwise. Ice cooling was applied to keep the batch temperature at 22–35° C. After the addition was completed, the whole was stirred at room temperature for another 3 hours. The slurry was stored under argon for the night (17½ hours), then it was filtered in a closed, argon-flushed, sintered-glass filter (8.6 cm. diam.), washing with 650 ml. of dry, purified heptane. The filtrate (1667 ml.), which was slightly turbid, was transferred to a ½-gallon bottle and capped under argon. For 2.000 gram-atoms of lithium charged, 1.5484 gram-atoms went to butyl lithium and 0.15675 gram-atoms were lost as Wurtz-Fittig reaction product.

EXAMPLE VI

*Ethyllithium in Heptane*

A one-liter, 4-necked flask was fitted with high-speed stirrer, reflux condenser (cooled with alcohol at −5° C.) and calcium chloride tube, Dry Ice trap, argon inlet, ethyl chloride vapor inlet and ice bath. Exactly 16.04 grams of 34.61 percent lithium-Vaseline paste (0.6% Na in the lithium; 0.800 gram-atom) were charged to the flask along with 400 ml. of dry, purified heptane. The flask was flushed with argon, then stirred while cooled in an ice bath. Exactly 25.81 grams (0.400 gram-mole) of ethyl chloride were charged to a 50-ml. Erlenmeyer flask, then this was connected by pressure tubing to the ethyl chloride vapor inlet, terminating just beneath the surface of the liquid slurry. Ethyl chloride vapor was run in at such a rate so the ice-cooled reaction mixture stayed in the temperature range of 11 to 22° C. (67 minutes required for the ethyl chloride addition). The 2.1 grams of liquid in the trap beyond the condenser (mostly heptane) were added to the reaction mixture, then the whole was stirred in a partial ice bath for 116 additional minutes at 13 to 16° C. At this point the ice bath was removed, and stirring was continued at 16 to 28° C. for another 113 minutes. At the termination of the stirring period, the slurry was quantiatively forced with argon pressure and dry heptane (150 ml.) rinsing into a 28-oz. bottle. The purple slurry (particles heavier than heptane) was capped under argon. The slurry, 558 ml. or 403.0 grams, was allowed to stand for 17 hours at room temperature, then three ½-inch glass spheres were added to break up crystals of ethyllithium.

The ratio of titratable lithium to charged lithium was 0.5026; whereas for conversion of ethyl chloride to ethyl lithium, the theoretical ratio is 0.5000.

EXAMPLE VII

*Butyllithium in Heptane*

A series of runs was conducted using lithium of different sodium content and the percentage of sodium, conditions of the reaction and yield are tabulated in the table which follows. The following general formula was employed:

Heptane (sodium-dried) _____ 1760 ml.
Lithium dispersion [1] _____ 69.40 grams [2]
1-chlorobutane ($N_D^{20}$ 1.4019) _____ 462.85 grams [3]

[1] 35% Dispersion-petrolatum; lithium alloy with various proportions of sodium as in following table.
[2] 10 gram-atoms of lithium.
[3] 5 gram-mols.

A stainless steel cylindrical closed pot (19.0 cm. inside diameter by 17.2 cm. deep) fitted with a pressure-sealed rotary stirrer, an argon inlet, a graduated dropping funnel and a reflux condenser with a calcium chloride tube was used in this series of experiments. A water jacket surrounded the pot, and water at a controlled temperature was pumped through the jacket at 274 gallons per hour.

A series of runs was made, using lithium metal containing different proportions of sodium alloyed therewith in the several runs as set forth in the following table. In each run, the lithium dispersion was charged first, followed by the heptane and the whole was stirred to a slurry under a blanket of argon, which was kept a few millimeters above atmospheric pressure throughout the run. With continued stirring the 1-chlorobutane was added through the dropping funnel at the rate indicated in the following table. After all of the 1-chlorobutane was added, the reaction mass was stirred for an additional 60 minutes after which the charge was blown over with argon into a one-gallon bottle previously filled with argon. The reactor was rinsed with 240 ml. of heptane and the rinses likewise blown over into the bottle.

At this point the reactor was opened and the inside rinsed with distilled water. An aliquot of this rinse was titrated for alkaline lithium with standardized hydrochloric acid to the faintest methyl orange change.

The volume of the butyllithium slurry in the bottle was measured by pouring water from a graduated cylinder into a matching one-gallon bottle until the liquid levels were equal. Exactly 1.00 ml. of slurry was titrated to the faintest methyl orange change with standardized 0.2 N hydrochloric acid. One ml. of slurry was heated in a dry, 60-ml. argon-filled bottle with 1.8 ml. of dry benzyl chloride and 10 ml. of sodium-dried, air-free ether for 2 minutes: after dilution with water the free alkali was titrated to the faintest methyl orange end point with 0.2 N hydrochloric acid.

The extent to which each reaction was carried and the percent theoretical yield of alkyllithium was calculated as follows:

$$\frac{\text{Total titer} - \text{titer after benzyl chloride}}{\text{Total titer}} \times 100\%$$

= percent of titratable lithium which was carbon-bound lithium (A)

Volume of slurry × total titer × normality of acid × 0.00694
= grams of titratable lithium in slurry Grams of titratable lithium in slurry
+ grams of titratable lithium in rinse
= grams of titratable lithium left $$\frac{\text{Total titratable lithium}}{69.40} = \frac{\text{Titratable lithium}}{\text{Charged lithium}} \quad (B)$$

$$\frac{1.0000 - B}{1.0000 - 0.5000} \times 100\% = \text{Extent of all reactions}$$

$$\frac{\text{Grams of total titratable lithium} \times A}{0.5 \times 69.40} \times 100\%$$

= percent of theory yield of alkyllithium

The particulars of the several runs are tabulated here:

REACTION OF TWO ATOMS OF LITHIUM WITH ONE MOLE OF 1-CHLOROBUTANE USING VARYING AMOUNTS OF ALLOYED SODIUM

| Sodium Alloyed in Lithium (percent) | Time to Add 1-Chloro-Butane (min.) | Reaction Temperature Range (° C.) | Extent of All Reactions [1] (percent) | Yield of Carbon-Bonded Lithium (percent) |
|---|---|---|---|---|
| 0.08 | 63 | 25.6–37.0 | 89.51 | 74.55 |
| 0.23 | 63 | 25.8–56.0 | 90.58 | 78.56 |
| 0.27 | 105 | 26.0–34.6 | 92.84 | 76.61 |
| 0.39 | 105 | 25.9–34.7 | 98.47 | 83.58 |
| 0.36 | 63 | 25.5–36.1 | 99.02 | 87.89 |
| 0.36 | 52.5 | 26.2–38.2 | 98.71 | 87.79 |
| 0.36 | 63 | 25.8–36.0 | 99.10 | 87.46 |
| 0.59 | 63 | 25.7–35.4 | 98.20 | 86.96 |
| 0.75 | 63 | 25.8–35.9 | 97.51 | 86.18 |

[1] Change of organic to ionic chlorine.

From the foregoing general discussion and detailed specific examples, it will be evident that this invention provides a novel and highly advantageous process for the manufacture of alkyllithium compounds. The undesirable presence, and entrainment of ether in the product is completely avoided. The materials used, lithium metal, hydrocarbon vehicles, and alkyl halides (individually or a mixture), are inexpensive and present no unusual hazards. The process is carried out in simple equipment, with only a minimum of skilled supervision.

The invention is disclosed in the claims which follow. What I claim is:

1. In the process of producing alkyllithium by reacting in a liquid hydrocarbon vehicle under a blanket of inert gas at a temperature between 0 and 60° C., substantially equimolecular amounts of finely divided lithium and monohaloalkane which comprises 3 to 8 carbon atoms, the improvement which comprises using lithium with which is alloyed 0.3 to 1.0 percent by weight of a metal of the class consisting of sodium and potassium.

2. The process of claim 1 in which 0.35 to 0.6 percent by weight of sodium is alloyed with the lithium, and the lithium alloy is dispersed in finely divided form in liquid petrolatum and added to a liquid aliphatic hydrocarbon of substantially 4 to 14 carbon atoms.

3. The process of claim 1 in which 0.35 to 0.6 percent by weight of sodium is alloyed with the lithium, and the lithium alloy is dispersed in finely divided form in liquid petrolatum and added to a liquid aliphatic hydrocarbon of substantially 4 to 14 carbon atoms, and the reaction is carried out at 25 to 40° C.

References Cited in the file of this patent
UNITED STATES PATENTS 2,914,578    Nobis et al. _____ Nov. 24, 1959
2,947,793    Eberly _____ Aug. 2, 1960

OTHER REFERENCES

Rochow et al.: "The Chemistry of Organometallic Compounds," Wiley & Sons, New York, 1957, page 67.

Hampel: "Rare Metals Handbook," Reinhold Pub. Corp., New York, 1954, pages 215–221.

Kirk and Othmer: "Encyclopedia of Chemical Technology," Interscience Encyclopedia Inc., New York, 1947, vol. 1, pages 431–435.

Foote Mineral Company, "Technical Data Bulletin 101," revised April 1959.